Figure 2C:
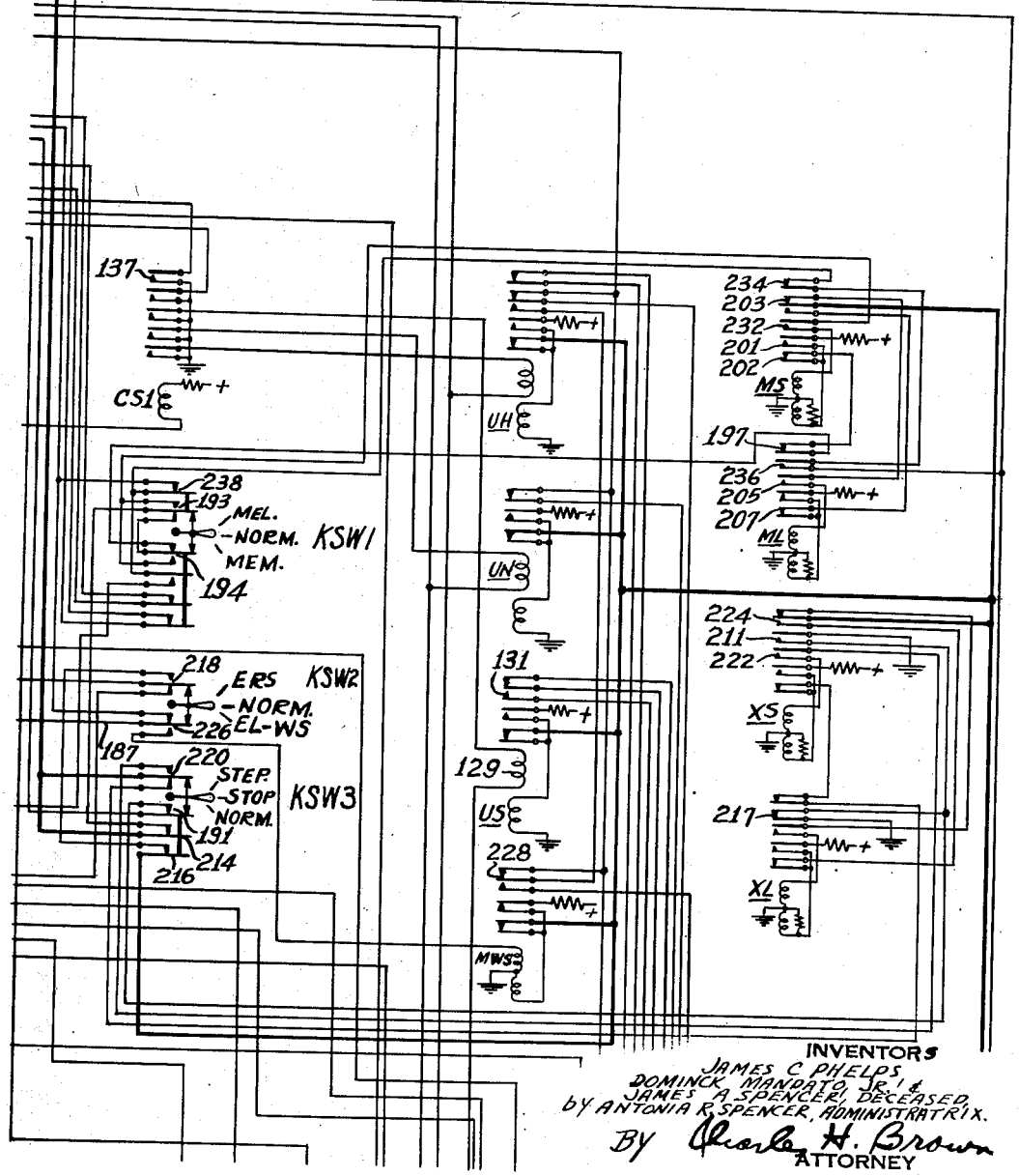

March 23, 1954
J. C. PHELPS ET AL
2,673,236
SIGNALING CODE CONVERTER
Filed Dec. 19, 1951
7 Sheets-Sheet 1
Fig_1
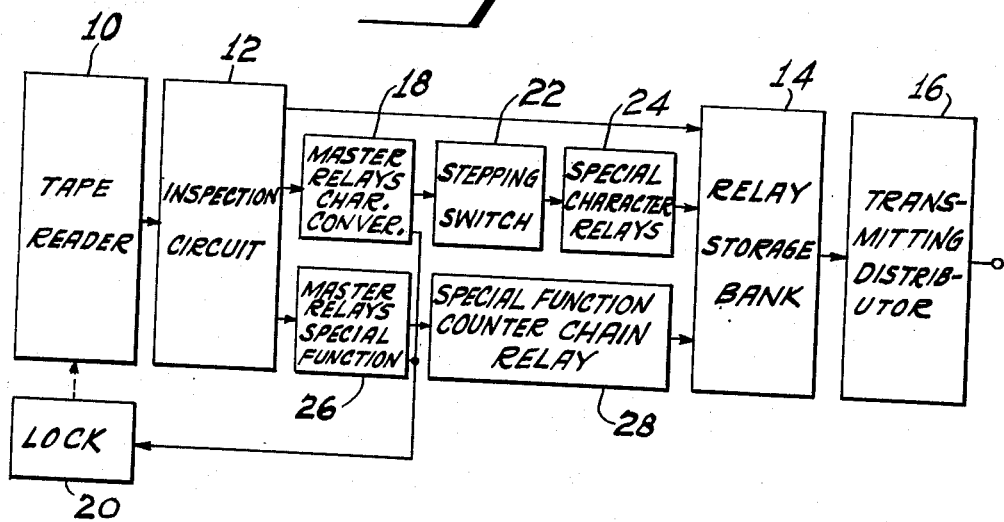
KEY TO FIG.2
| 2a | 2b | 2c |
|---|---|---|
| 2d | 2e | 2f |
Inventors
JAMES C. PHELPS,
DOMINCK MANDATO, JR. &
JAMES A. SPENCER, DECEASED,
by ANTONIA R. SPENCER, ADMINISTRATRIX.
BY Charles H. Brown
ATTORNEY

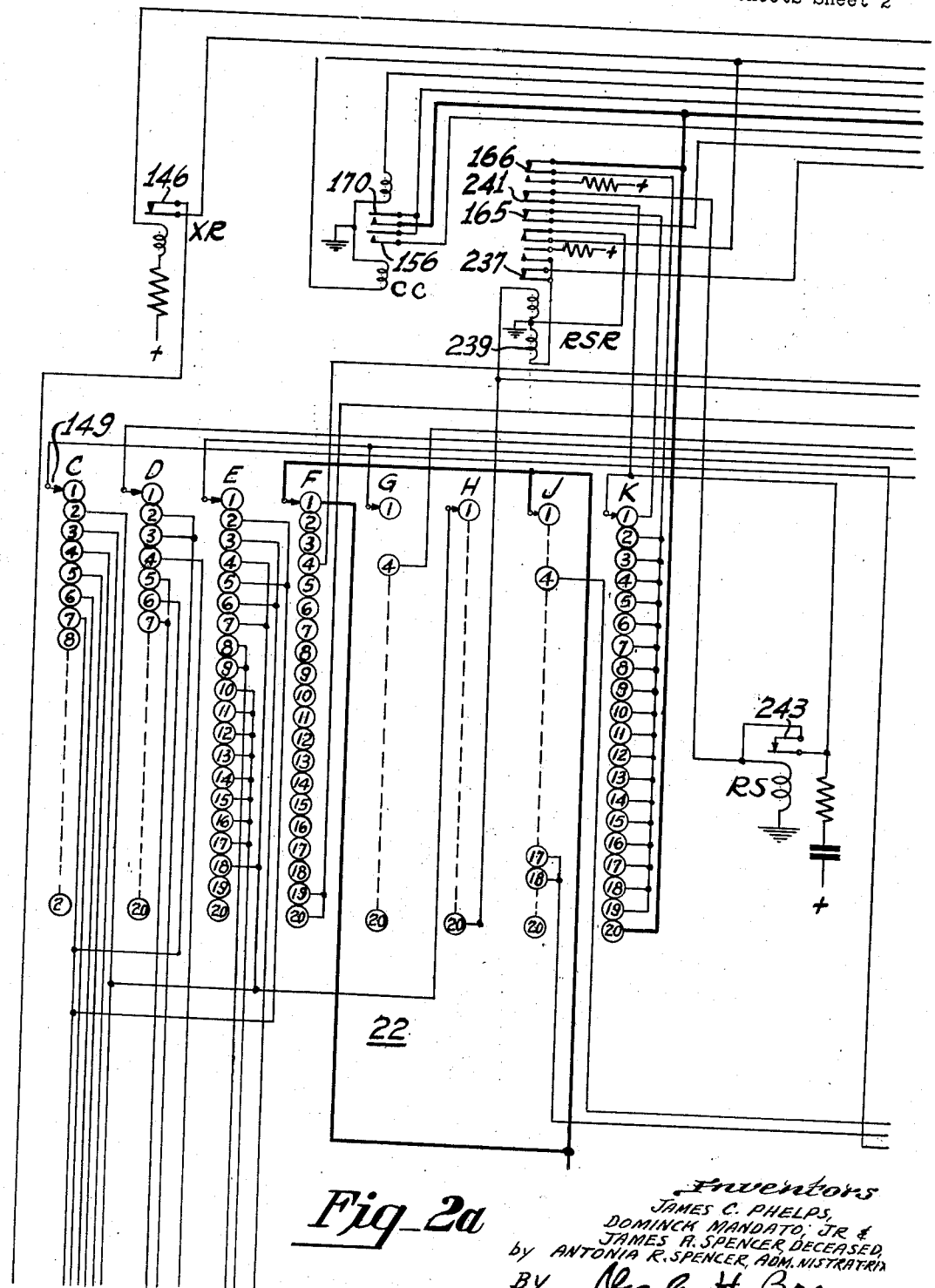

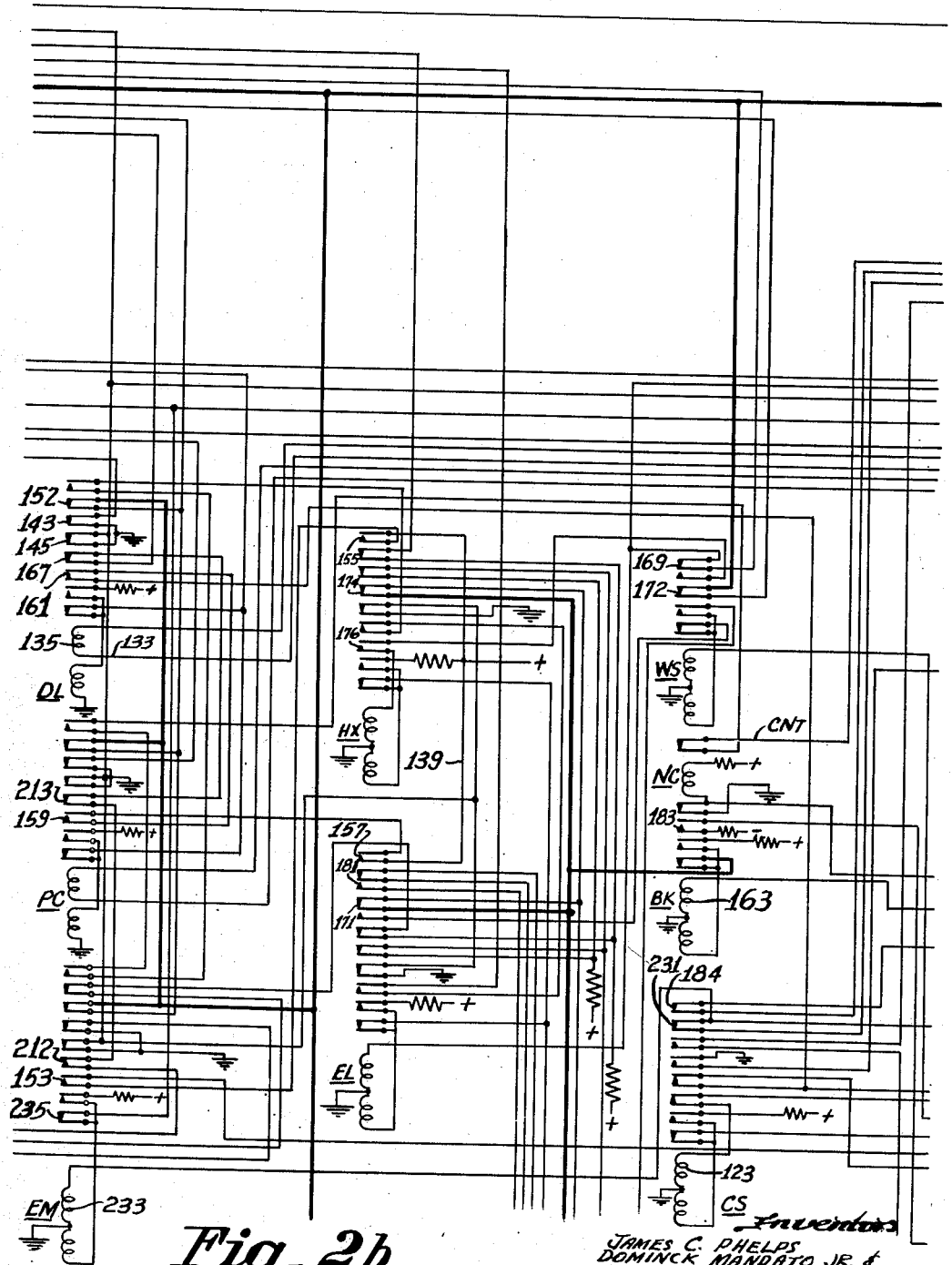

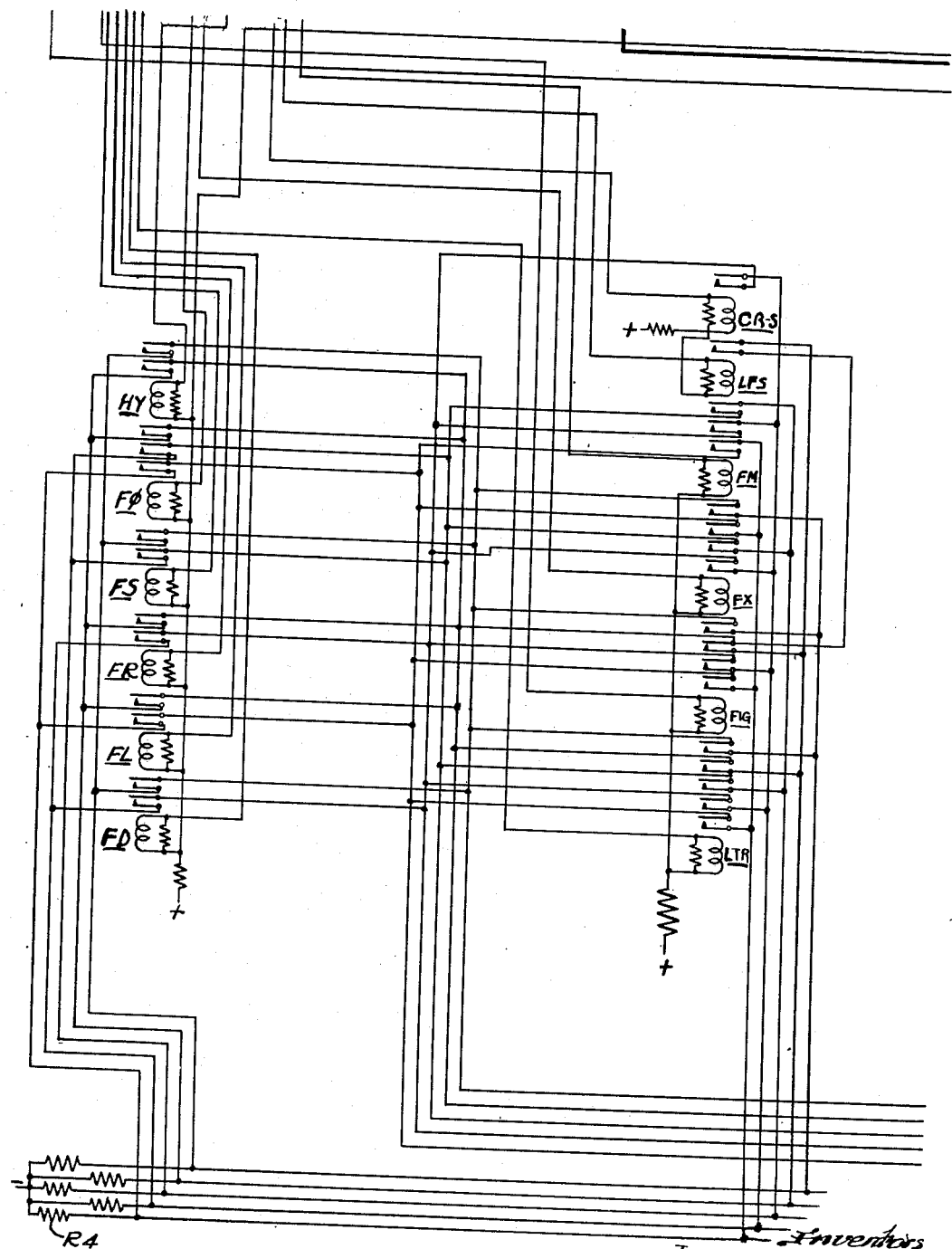
Fig_2d

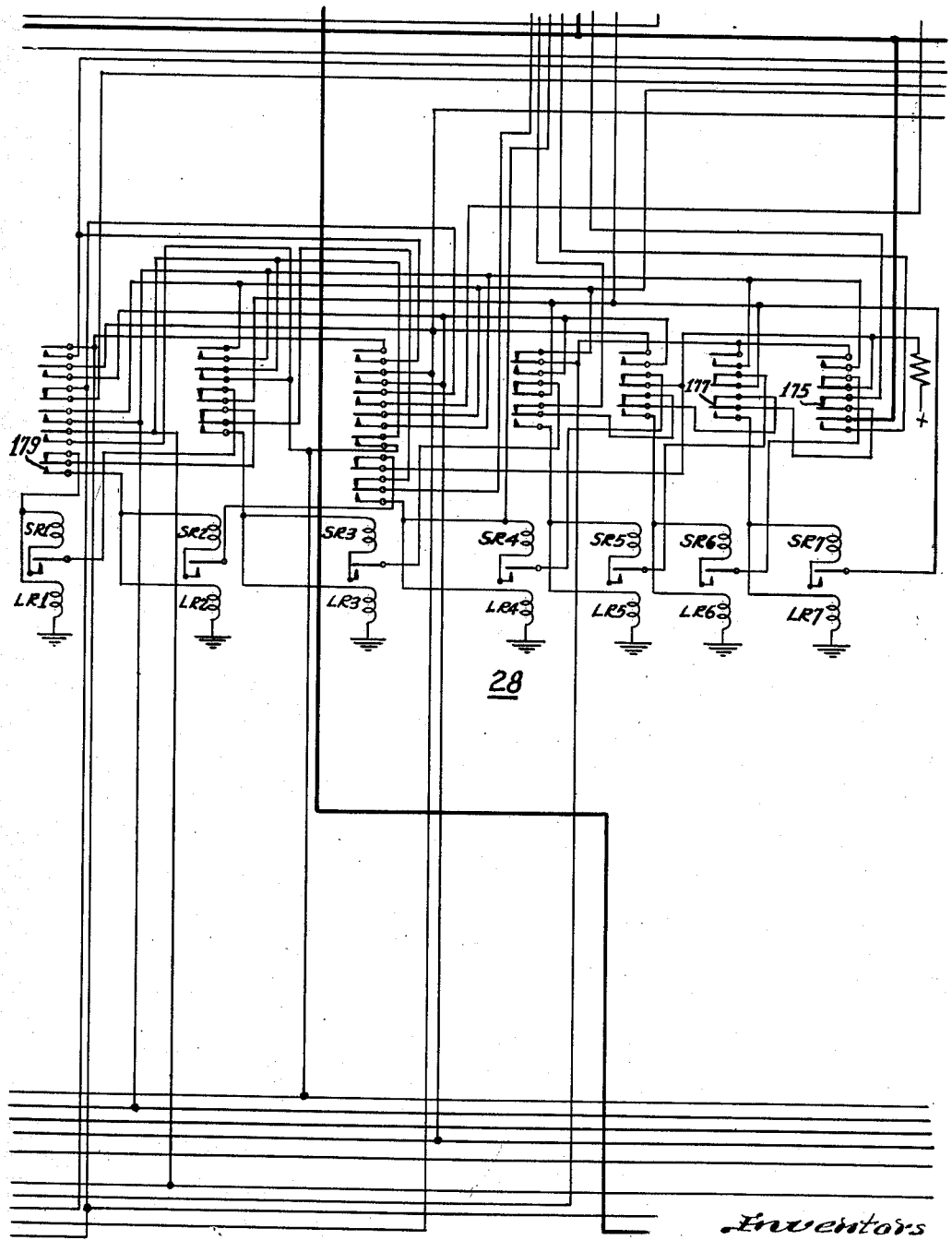
Fig_2e

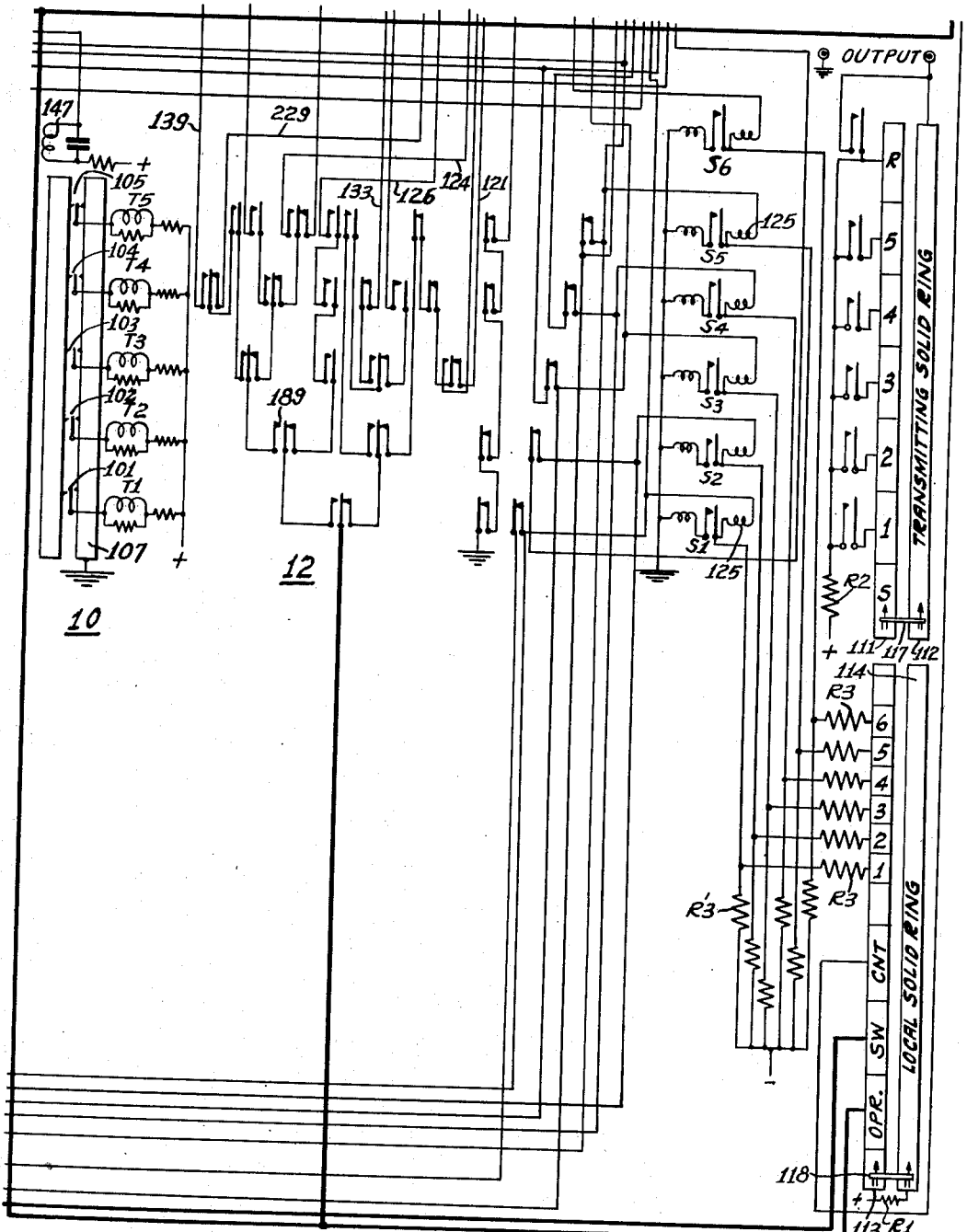

Patented Mar. 23, 1954

2,673,236

UNITED STATES PATENT OFFICE 2,673,236

SIGNALING CODE CONVERTER

James Curtis Phelps, Woodcliff Lake, N. J., Dominick Mandato, Jr., Yonkers, N. Y., and James Albert Spencer, deceased, late of Teaneck, N. J., by Antonia R. Spencer, administratrix, Teaneck, N. J., assignors to Radio Corporation of America, a corporation of Delaware Application December 19, 1951, Serial No. 262,458

10 Claims. (Cl. 178—2)

The invention relates to teleprinter communication and it particularly pertains to a circuit arrangement for transcribing messages wherein certain substitutions must be made in certain of the character assignments.

Messages originating in one teleprinter system of communication are frequently transmitted over circuits of a second teleprinter system wherein the character assignments for some of the code combinations differ. Because of this condition, such messages must be manually reprocessed. This reprocessing is uneconomical from both time and pecuniary viewpoints. Also, it is often desirable to print a message originating in tape form on a page format without involving manual reprocessing and its attendant disadvantages.

It is an object of the invention to automatically accomplish all necessary conversions and insertions, as well as to provide certain automatic and semi-automatic controls needed for meeting with traffic handling requirements.

A more specific object of the invention is to provide an improved circuit arrangement for translating certain code character combinations into different code character combinations with improved efficiency.

Another more specific object of the invention is to provide an improved circuit arrangement for translating a single incoming character code selection into multiple character selections on the outgoing circuit.

A further and more specific object of the invention is to provide an improved circuit arrangement for automatically inserting carriage return and line feed code signal combinations into the outgoing circuit in response to a discrete code signal appearing in the incoming circuit or in response to a specific character count followed by a word space selection.

A still further object of the invention is to provide an improved circuit arrangement for automatically inserting a code selection for the hyphen followed by carriage return and line feed selections in response to a specific character count when the last character is other than a word space.

Still another more specific object of the invention is to provide an improved circuit arrangement for converting end-of-message signals automatically into carriage return and line feed signals.

A still further and more specific object of the invention is to provide an improved manual control circuit for advancing perforated tape through a tape reader one character at a time.

Another and more specific object of the invention is to provide an improved manual control circuit for selectively deleting characters existing in the perforated tape from the output signal train during manual advance of the tape.

The objects of the invention are attained in a circuit arrangement in which a tape reader is coupled to a relay storage bank to energize the same in condition for retransmission of the code characters by way of a transmitting distributor coupled to the relay storage bank. An inspection circuit interposed in the connections between the tape reader and the relay storage bank prevents transmission of certain code combinations by blanking the relay storage bank prior to transmission by the transmitter distributor and energizing additional circuitry to substitute a different code combination in the storage bank prior to transmission by the transmitting distributor. In some instances more than one code combination is set up in the relay storage bank and transmitted in response to actuation of the inspection circuit. Preferably, this plural substitution is accomplished by means of an inter-connected function signal relay chain and an insertion sequence controlling stepping switch.

Although the device disclosed herein is designed to meet with the differences existing between two specific codes, it is obvious that the arrangement may conveniently be altered to meet with other requirements without departing from the spirit of the invention.

A specific embodiment of the invention, given by way of example only, will be described with reference to the accompanying drawing, forming a part of the specification, and in which:

Fig. 1 is a block diagram of a typical circuit arrangement according to the invention; and Fig. 2 (Figs. 2a, 2b, 2c, 2d, 2e and 2f being taken together) is a schematic diagram of a circuit arrangement as shown in Fig. 1.

Functional description

Referring to Fig. 1 there is shown a functional diagram of an arrangement according to the invention. Incoming signals in a given code are punched in a tape in known fashion and the tape is then applied to a tape Reader 10. Simultaneous current conditions are set up by the tape Reader 10 and applied to an Inspection circuit 12. For characters which have the same code combinations assigned in both the incoming and outgoing signals, substantially direct circuits are established by the Inspection circuit 12 to a Character Storage bank 14 from which the characters are transmitted by means of a Transmitter distributor 16. For code combinations of unlike character assignments, the Inspection circuit 12 is arranged to connect additional circuitry into the arrangement to convert from the incoming combination to the corresponding combination in the outgoing signal before applying currents to the Character Storage bank 14. For example, where the code combinations assigned to a symbol, for example the dollar sign ($), is to be transmitted as a word or an abbreviation of a word, as DLRS for the example given above, the currents from the Inspection circuit 12 are applied to a master Control relay bank 18. If the new combination is of greater length than that of the incoming signal, a tape reader Lock 20 is actuated in response to functioning of the circuit of the master Control relay bank 18 to prevent new characters being applied to the Inspection circuit 12 before the circuit is clear. An Insertion Sequence control switch 22 is actuated under control of the master Control relay bank 18 to select in proper order and actuate the proper Special Character relays of a bank 24 containing a number of relays having output contacts arranged to establish currents in accordance with the code combinations involved. In the example given above the bank 24 would include at least four relays having contacts arranged to apply currents to the Character Storage bank 14 representative of the code characters D, L, R and S.

Where special functioning of the apparatus to which the Transmitting distributor 16 is connected is required, the circuitry for setting up the requisite code combination is interposed in the arrangement under control of the Inspection circuit 12 in the form of a bank 26 of Special Function relays and a Special Function Signal relay chain 28 which apply currents representative of the code characters calling for performance of the desired function in the Character Storage bank 14.

*Basic components*

Referring to the schematic diagram of Fig. 2, the tape Reader 10, the Inspection circuit 12, the Character Storage bank 14 and the Transmitting distributor 16 are shown in Fig. 2f.

The tape Reader 10 is a standard mechanically operated transmitter. It is provided with five seeker pins for exploring perforations in a paper tape. The seekers are mechanically linked to individual switch arms 101—105 for completing circuits from a bus-bar 107 located in the transmitter through the coil windings T1—T5 of the reading relays.

Whenever a seeker pin passes through a perforation in the tape, the corresponding switch arm comes to rest against a marking bus-bar 108 but when the pin is blocked by the web of the tape, the switch arm remains in contact with the spacing bus-bar 107, which is grounded whereby the Reading relays are operated when the signal element is spacing.

The Transmitting distributor consists of four concentric metal rings 111—114 arranged in pairs, and traversed by rotating brushes 117, 118 which electrically connect each pair of rings together.

One ring in each pair is segmented and its segments electrically insulated from one another; its mate is a solid or slip ring.

One pair of rings is used for supplying time impulses for operating the device and the other pair for connecting the code signals to the outgoing line.

The five Reading relays T1—T5 are provided with contact assemblies for selectively establishing Inspection circuits according to the known binary progression method, the connections preferably being made in "Christmas tree" or pyramid fashion, as well as for connecting priming voltage to the Operate coil windings of the Storage relays S1—S6.

The Storage relay bank is comprised of five Storage relays S1—S5, one relay for each element in the code, and a Blanking relay S6 for blanking the Storage relays under certain conditions.

Each Storage relay is equipped with two coil windings and two pairs of normally open or make contacts; an Operating coil winding for actuating the relay and a Locking winding associated with one pair of contacts for locking the relay in the actuated condition. The second pair of normally open or make contacts is employed to connect signalling battery to the transmitting segments.

*Operation of reading and storing relays*

Assuming, for example, that as the distributor brush 117 passes over the segment R of the Transmitting ring 111, a selection consisting of code signal elements 1, 2, 4 and 5 marking, corresponding to the Figures Shift code character, is established in the tape Reader 10, seeker pins 101, 102, 104 and 105 pass through perforations in the tape. The remaining seeker pin number 103 is held down by the web of the tape. Reading relays T1, T2, T4 and T5 are not operated and a circuit is complete from the Operate segment OPR of the Local ring 113 through contacts on the Reading relays over conductor 121, through the Case Shift relay CS, Operate coil winding 123 Fig. 2b to ground causing the Case Shift relay CS to operate and register an upper case transmission. Because commercially available relays do not have sufficient contacts for the circuits to be controlled, an auxiliary case shift relay CS1 is used and is operated in tandem with the case shift relay CS.

Since Reading relays T1, T2, T4 and T5 are now unoperated, negative battery is applied through resistors R4 Fig. 2d, to one side of the operate windings 125 of the Storage relays S1, S2, S4 and S5.

As the distributor brush 118 traverses Local segments 1, 2, 3, 4, 5 and 6 of the Local ring 113, plus battery is connected through resistors R1 and R3 to the Operate windings 125 of the Storage relays S1, S2, S4 and S5 only, causing these relays to operate and lock up.

Since the circuits through the Operate coils 125 of the Storage relay S3 and the Blanking relay S6 are incomplete at this time, the positive pulses coming from segments 3 and 6 serve to cancel any holding voltage coming from minus through resistor R3' so that if either of these relays had been locked up from a previous selection, they would now be released.

With Case Shift relays CS, Fig. 2b, and CS1, Fig. 2c, registering upper case, the system is in condition to perform any of the required upper case translations.

For example, in one code the comma is transmitted by sending the letter N after the Figures Case Shift, that is, upper case N as it were, is actually the comma. In another code, the comma is transmitted as the letter S following the Figures Case Shift. It is, therefore, desired that when the code combination corresponding to the letter N is received after the circuits have been set to register upper case or Figures, that "N" will actuate the output as though the code combination corresponding to the letter S were received. Such connections are provided for in the circuit arrangement shown in Fig. 2.

Assuming that the letter N (elements 3 and 4 marking) is set up in the tape Reader 10 at a time immediately following the energizing of the Case Shift relays CS and CS1, the third and fourth Reading relays T3 and T4 will be released. A circuit is established from the Operate segment OPR of the Local ring 113 through the Inspection circuit contacts of the Reading relays over a conductor 124 through the Release coil winding 129 of a Character Converting relay US and contacts of auxiliary Case Shift relay CS1 to ground. As the brush 118 next traverses the Operate Segment OPR, a pulse is conveyed over this circuit causing the Character Converting relay US to release.

In the normally operated position, the relay US has transfer contacts 131 positioned to complete a circuit from the resistor R4 to the Operate coil of Storage relay S4. However, when relay US is released as described above, the transfer contacts 131 move to a new position and switch this normal circuit from storage relay S4 to storage relay S1. Thus the input selection of elements 3—4 marking is converted to an output selection of elements 1—3 marking corresponding to upper S or comma in the outgoing code. Any other single character conversion may be similarly accomplished by application of this switching principle.

In some instances it is necessary that an incoming single upper case selection be transmitted as a number of lower case characters, as, for example, when upper case D or $ is converted into DLRS.

Whenever the character D is selected while the Case Shift relays CS and CS1 are energized, the Reading relays T1 and T4 release and complete a circuit from the Operate segment OPR through contacts of the Inspection circuit 12 over a conductor 133 and through the Release coil winding 135 of a Special Insertion relay DL, Fig. 2c, to ground by way of contacts 137 on the Case Shift relay CS1. Relay DL is released by the next operate pulse and effects a number of circuit changes hereinafter described.

The tape Reader is mechanically locked in a spacing condition in order to prevent tape feeding during times when insertions are being made. This is accomplished by contacts 145 on relay DL which are closed when relay DL is released to connect ground through contact 146 on a Transmitter Lock relay XR to a Locking magnet coil 147 which actuates a mechanical locking arrangement (not shown).

In certain codes there may be a character assignment for all code elements spacing, although this combination is usually avoided if possible. The circuit according to the invention permits such an assignment if desired. Therefore, it is necessary that this combination as set up by the tape Reader 10 when the latter is locked be nullified. In this instance nullification is accomplished directly by opening the Blank conductor 139, which passes through normally closed contacts 153 of the End-of-Message relay EM, 155 of the Hyphen Control relay HX, 157 of the End-of-Line relay EL, 159 of the relay PC, at contacts 161 of the relay DL to energize the release coil winding 163 of the Blank relay BK and remove operating potential from the Blanking relay S6. Ground is connected to the wiper 149 of the Insertion Sequence switch 22 level C for operating the Inserter relays which connect to switch points 2, 3, 4, 5, 6 and 7 of level C of the stepping switch 22.

Inserter relays LTR, FD, FL, FR, FS and FIG are provided with contact assemblies which connect selecting potential from R4 resistors to the Operate windings of corresponding Storage relays, which in the case of the LTR relay are relays S1, S2, S3, S4 and S5.

The Switch Operate circuit appearing on switch point 1 of level K of the Insertion Sequence switch 22 is closed from the Segment SW of the Local ring 113, through contacts 152 of the relay DL and contacts 165 of the Reset relay RSR to apply potential to switch point 1 of level K and then through the wiper of level K to contacts 241 of the Reset relay RSR to the coil of the Stepping relay RS and to ground.

This causes the rotary switch 22 to advance one step from switch point 1 to switch point 2. The Switch points 2 to 19 inclusive, of level K, are connected together and collectively receive pulses from the segment SW once each revolution thereafter by way of the transfer contacts 166 of the Reset relay RSR. Thus the Insertion Sequence switch 22 is caused to advance one step with each revolution as long as the Reset relay RSR remains released.

In a manner similar to that described above the combination of elements 3, 4 and 5 marking following a Figures Case Shift signal, corresponding to upper case M or per cent sign in the incoming code is converted into the characters hyphen, zero, stroke, zero (-0/0) indicating per cent in the outgoing code.

Page teleprinters require assignment of code combinations for actuating circuits at the printer which will function to return the printer carriage and feed the paper through the machine. In tape operation these code combinations are generally assigned to other operations. A basic page printer function inserting apparatus is shown and described in U. S. Patent 2,452,333, issued October 26, 1948 to J. A. Spencer, C. L. Kennedy and L. A. Thomas. In the circuit arrangement according to the invention these code combinations when received are converted by improved means as indicated above to the corresponding page printer assignment. Carriage return and line feed function combinations as required are automatically inserted in the text by the improved circuit arrangement shown in Fig. 2. The circuit arrangement according to the invention also is designed to insert a hyphen automatically in any long word which must be broken at the end of a line.

For convenience of discussion, carriage return, line feed and hyphen operations are referred to as End-of-Line Functions and are considered as being of three types:

A. One which is initiated by an end-of-line code combination sensed by the tape reader (usually second element only marking) being transferred to the storage relays, B. One which is initiated by the inspection circuit being operated in response to the first word space following a specific character count, and C. One which is initiated by a counting circuit reaching a predetermined character count only.

The system consists of relays WS, EL, HX, LR1—LR7, inclusive, and SR1—SR7, inclusive, together with a counter CC for counting the transmissions and closing the control switches. Relays LR1—LR7 and SR1—SR7 constitute a counting type relay chain for controlling the insertion End-of-Line function code signals in the outgoing circuit. These relays are arranged in pairs, each pair consisting of one LR and one SR relay and connected in a fashion similar to that known as the "Molina Chain" so that each pair of relays or each stage, operates and releases progressively. Each SR relay is provided with additional Signalling contacts for connecting signals Fig., Hyphen, Ltr., Carriage Return and Line Feed to the outgoing line.

Relays EL, HX and WS cooperate with the character counter CC in controlling automatic End-of-Line insertions. The character counter may be described in the interest of clarity as a stepping switch having contacts at the 56th and 70th or other desired steps only, together with the coil windings, armatures and so forth, as required to step the switch arms. Actually, a pawl and ratchet operated cam cooperating with a pair of telephone type spring contacts is preferred in the interests of economy and simplicity. Obviously, any known form of count registering device can be used with equal efficiency.

The function of the Character Counter CC is to condition the circuit for effecting End-of-Line insertion automatically by closing contacts upon predetermined character counts. The Character Counter CC is provided with two pairs of contacts, 156 and 170; the former are closed upon transmission of the 56th character to the outgoing line and the latter are closed upon the 70th character for conventional page printers. Obviously, other character counts may be used for different equipment.

The operate circuit from the Switch step segment SW on Local ring 113 passes through contacts 170 on the Character Counter CC and transfer contacts 169 of relay WS so that if contacts 170 are closed at a time when the Word Space relay WS is operated, the Hyphen Control relay HX will release but if the Word Space relay WS is released due to the 70th character being a word space, the End-of-Line relay EL will release. The operate circuit for the Special Function Signal relay chain 28 from the Operate segment OPR is completed either through transfer contacts 171 on the End-of-Line relay EL or contacts 174 on the Hyphen Control relay HX, whichever has been released, to contacts 175 on the Step relay SR7, then to contacts 177 on the Step relay SR6, and so on to contacts 179 of the Step relay SR1 from which it is terminated on the windings of the Step and Lock relays SR1 and LR1. It will be noted that as the operate circuit progresses from the Step relay SR4 to the Step relay SR3 it passes through transfer contacts 181 on the End-of-Line relay EL where it is so connected that when the relay EL is operated the operate pulse is connected to the coil windings of relays LR1 and SR1 and the entire relay chain 28 is actuated but if relay EL is not operated, the operate circuit is transferred to the coil windings of relays LR4 and SR4 so that only stages 4, 5, 6 and 7 of the relay chain 28 are actuated to connect the End-of-Line signals to the outgoing circuit.

Consider condition A wherein a code combination of second element marking only is sensed in the tape reader 10. A circuit is completed from the Operate segment OPR over a conductor 126, contacts 184 on the Case Shift relay CS, contacts 226 on the key switch KSW2, through the Release coil winding of the End-of-Line relay EL. Relay EL is released by the Operate pulse from the Operate segment OPR to connect power to the Reset coil of the Counter CC, to close the transmitter locking circuit, to open the Count and Blank circuits and to complete the Operate circuit to the counting chain 28 and to close the relays LR4 and SR4. The three next succeeding operate pulses from the Operate segment OPR consecutively close the Lock and Step relays LR5, SR5, LR6, SR6, LR7 and SR7. Thus End-of-Line signals corresponding to two carriage returns and two line feeds are connected to the outgoing line.

Consider condition B wherein the contacts 156 have been closed and any subsequent character prior to the seventieth character is Word Space. The Word Space relay WS is thereby deenergized and a circuit is completed from the switch Step segment SW of local ring 113 through contacts 172 on the Word Space relay WS and contacts 156 on the Character Counter CC to the Release coil winding of the End-of-Line relay EL so that the latter is also released and the same series of events occur as has been previously described in connection with condition A.

Consider condition C wherein the last word in a line is such that a word space does not occur between the counts of 56 and 70. Contacts 170 are then closed with the Word Space relay WS remaining operated. The circuit from the switch Step segment SW may be traced through contacts 170 of the Character Counter CC, front contacts 169 on the Word Space relay WS through contacts 176 of the Hyphen Control relay HX and the release coil winding of the relay HX to ground. The relay HX is released and the same control circuits are now completed by the relay HX as were completed by the End-of-Line relay EL except that the Special Function Signal relay chain operating circuit is now connected to the windings of relays LR1—SR1 so that all seven stages of the chain are actuated and Figures, Hyphen, Letters, Two Carriage Return and Two Line Feed signals are transmitted over the outgoing line.

A double period is often used in the incoming code to indicate message termination, upon receipt of which it is usually desirable to insert two carriage returns and several (usually eight) line feed signals in the outgoing code. This is accomplished according to the invention by circuits shown particularly in portions 2a, 2b and 2f of Fig. 2.

Upon sensing of the first period (fourth element only marking) by the tape Reader 10 a circuit is established from the Operate segment OPR over conductor 229 through contacts 231 of the Case Shift relay CS and the Release coil winding of the End-of-Message relay EM to ground, causing that relay to release and effect the same circuit changes as occurred when the Special Insertion relay DL was released, except in this instance the switch wiper for level E instead of level C of the Insertion Sequence switch 22 is connected to ground so that as the switch wiper passes over switch points 2, 3 and 4 the code combinations corresponding to Figures shift, M, and Letters shift, respectively, are transmitted. This upper case M imparts a period to the outgoing code.

Since it is only a double period that is to be recognized as an end of message indication it is now necessary to advance the input tape one character to determine the combination thereof. This advance must take place while the Letters Shift of the preceding sequence is being transmitted. For this reason the circuit through the coil winding of the Transmitter Lock relay XR is completed simultaneously with that to the Letters signal relay LTR so that the circuit to the Lock magnet 147 is opened for one transmitting cycle.

If the code combination sensed at this time in the tape Reader 10 is other than a second period, the End-of-Message relay EM is reoperated by a pulse from the Operate segment OPR passing through the wiper and switch point 4 of level F of the Insertion Sequence switch 22, and the contacts 235 and Operate coil winding of relay EM causing it to operate and lock up. In so doing, relay EM contacts 212 close a circuit from the Operate segment OPR through point 4 of level J, contacts 213 and 167 of the Insertion relays PC and DL, contacts 237 and the operate coil winding 239 of the Reset relay RSR to ground. The Reset relay RSR is thus operated and locked up, its contacts 166 connecting plus voltage to switch points 2 through 19, inclusive of level K of the Insertion Sequence switch 22, causing that switch to step rapidly to the home position on the switch point 1 through the self-interrupting contacts 243.

If the second code combination sensed by the tape Reader 10 when the Stepping switch 22 is in the fourth position, is a second period the Operate pulse from Level F point 4 arrives at the End-of-Message relay EM Operate coil at exactly the same time as the Operate pulse coming from the sensing contacts arrives at the Release coil. Thus relay EM remains unoperated and transmission continues as controlled by the points of switch level E of the Insertion Sequence switch 22, again placing the code combinations corresponding to Figures Shift, M, and Letters Shift in the outgoing code, followed by two carriage returns and eight line feed signals.

Blanking circuit

Whenever the tape Reader 10 is in a spacing condition, all reading relays T1—T5 are operated and a circuit is completed from the operate segment OPR over the Blank conductor 139, through normally closed contacts, relays and switches as described below to the Release coil winding 163 of relay BK to ground. The Blank relay BK is released in response to the Operate pulse OPR and negative potential is connected through contacts 183 on the Blank relay BK to the operate coil of the Storage relay S6. Relay S6 is then operated in response to the next local pulse which is developed as segment 6 of local ring 113 is traversed by brush 118 and steady marking signal is placed on the outgoing line.

The blanking circuit conductor 139 is connected in series with contacts 153 on the End-of-Message relay EM, 155 on the Hyphen Control relay HX, 157 on the End-of-Line relay EL, 159 on the Insertion relay PC, 161 on the Insertion relay DL, and 218 on the key switch KSW2 so that on operation of any one of these relays or the key switch the Blanking circuit is opened.

Manual controls

While the principles of the circuit arrangements hereinbefore described may be applied to make almost any desired conversion automatically, it is preferable for reasons of economy and in the interest of flexibility that manually controlled means be provided for stopping transmission; advancing the tape through the tape reader and transmitting one character at a time; and advancing the tape through the tape reader one character at a time and erasing the character thus advanced.

The arrangement according to the invention for manually stopping transmission, then advancing the tape through the tape reader one character at a time and also for either transmitting or deleting these characters if such is desired will be described in detail.

When the keyswitch KSW3 is moved from its Normal to the Stop position the contacts 191 close a circuit from ground at contacts 211 of Single Step function relay XS and contacts 217 of relay XL to the Lock magnet 147 via contacts 146 of the Single Step Lock relay XR. This at once locks the tape Reader 10 in a spacing condition and thus stops further action into the assembly.

Simultaneously with the closure of contacts 191 of KSW3 described above the contacts 214 of the same switch condition a circuit from local segment SW to the Operate coil of a Manual Step relay MS via contacts 193 and 194 of KSW1 (in the Normal position), contacts 197 of the Manual-End-of-Line relay ML and contacts 202 of the relay MS. Thus on the first SW pulse occurring after KSW3 is moved to the Stop position the relay MS is operated and locked up. With the Manual Step relay MS in the operated position, the contacts 203 condition a circuit from the Operate segment OPR to the Operate coil of relay ML by way of contacts 207. Hence at the first Operate pulse following the above Switch Step pulse the relay ML is operated and locked up. It can be seen that the time interval between one Switch Step pulse and the next succeeding Operate pulse is identified with one cycle of the brush arms 117 and 118. This timing interval will be referred to below when discussing the single step advance. What is significant at this point, however, is that by moving KSW3 to the Stop position the relays MS and ML have both been operated and locked up—in other words "primed" for subsequent action to be described later.

Again coincident with the closure of contacts 191 and 214 of KSW3, the contacts 216 condition a circuit from the Operate segment OPR to the contacts 218 of KSW2 making part of the functioning of that key switch dependent upon KSW3 being in its Stop position. This also is a factor to be borne in mind when subsequent actions are described.

If now key switch KSW3 be moved from the Stop to the Step position, the contacts 220 connect the Switch Step segment SW to the Release coil of the Single Step function relay XS by way of the contacts 222 so that on the first Switch Step pulse after contact 220 closure the relay XS is released.

With the Single Step function relay XS de-energized, the contacts 211 break the ground being connected to the transmitter Lock magnet 147 so that tape advance can proceed in the tape Reader 10. However, on the next following Operate pulse—corresponding to one revolution of the output Transmitter Distributor—relay XS contacts 224 are positioned to connect this pulse into the release winding of the Single Step Lock relay XL which falls open and in so doing the contacts 217 restore the ground to the Lock magnet 147, stopping tape advance after the single character transmission. If KSW3 remains in the Step position, no further action takes place, both the Single Step function and Lock relays XS and XL staying de-energized. KSW3 must be moved to the Stop position for the contacts 220 to apply Switch Step pulses to operate the XS relay before a repetition of this one character advance can be made. Thus one and only one step can be taken with each manipulation of the key switch KSW3 from the Stop to the Step Position.

With this Stop and Step control established by the key switch KSW3 the key switch KSW2 is manipulated to cause an "erasure" or blanking of the characters thus established only when in the Stop or Step position of the key switch KSW3.

As previously noted, a Switch Step pulse SW is available to KSW2 contacts 218 only when the key switch KSW3 contacts 216 are closed. With the key switch KSW2 in the erase position ERS, contacts 218 convey the Switch Step pulse to the Release coil of the Blank relay BK, whose contacts 183, as previously described operate the Blanking relay S6. Hence, with steady marking potential on the output, the character actually sensed in the tape Reader 10 sequence is not effective in the outgoing line. Erasure has accordingly taken place.

Further manual controls are available as follows:

(a) Conversion of a received double dash (=) corresponding to an End-of-Line function in one code to a word space;
(b) The insertion of an End-of-Line sequence;
(c) The insertion of End-of-Message signals.

With the key switch KSW2 in the EL—WS position, contacts 226 switch the conductor 187 from the Release coil of the End-of-Line relay EL to the Release Coil of the Manual Word Space relay MWS. Contacts 228 of the relay MWS transfer the potential initially selected to operate the Storage relay S-2 to operate the Storage relay S-3 instead, thus accomplishing the conversion. Other conversions of this type may be arranged for in accordance with the principles of the circuit just described.

When key switch KSW1 was moved to the Stop position, it has been shown how the Manual Step and End-of-Line relays MS and ML were operated or "primed" for subsequent functioning. If when so primed, the key switch KSW1 be moved to the MEL position, the contacts 193 connect the SW pulse to the release coil of relay MS via contacts 232 de-energizing that relay. With relay MS unoperated and relay ML operated a circuit from the Count segment CNT is established by way of contacts 236 and 234 of the relays ML and MS, respectively, through contacts 238 of KSW1 to the release coil of the End-of-Line relay EL. Thus on the same revolution of the Transmitter Distributor immediately following the release of the relay MS, the relay EL is released to apply the two carriage return—two line feed sequencing normally produced by release of the relay EL. One and only one such sequence is introduced by this manipulation of KSW1 for, as previously mentioned, on the next succeeding Operate pulse following the initiating Count pulse above, the manual End-of-Line relay ML is released thus destroying the circuit to the end of line relay EL. Key switch KSW1 must be restored to Normal to re-prime the MS—ML relays to initiate a second function sequence.

In a similar manner the End-of-Message relay EM is activated when KSW1 is moved to the MEM position.

The invention claimed is:
1. A printing telegraph system arranged for producing outgoing signals in a desired operational code in response to signals established in a given operational code, including a tape reader incorporating tape advancing means, a relay inspection circuit having the input thereof coupled to said tape reader and a plurality of outputs, a bank of signal element storage relays coupled to one of said outputs to establish code signal elements therein corresponding to the signal elements established by said tape reader, a transmitting distributor having an output connection coupled to said relay storage bank for transmitting signal elements established therein and local connections generating sequentially occurring pulses for actuating said system in proper time phase, a tape reader locking magnet arranged when energized to lock said tape reader in a spacing condition, a plurality of character conversion control relays coupled to others of said outputs individually responsive to predetermined characters as expressed in said given code, a plurality of special character relays having contact structures coupled to relays of said relay storage bank, switching means connecting selected ones of said special character relays to the proper character conversion relays to blank signal elements established in said relay storage bank and insert signal elements expressing the character under consideration in said desired code under control of said transmitting distributor, a plurality of function insertion control relays coupled to further ones of said outputs individually responsive to predetermined characters and sequence of characters as expressed in said given code, and a group of cascade connected relays having contact structures coupled to said storage relays and operate windings coupled to said function insertion control relays to insert characters in said desired code in said relay storage bank to produce special function signals at said output connection, character count registering means, other switching means coupled to said count registering means to energize said locking magnet and to interconnect said relay storage bank and said group of cascade connected relays, said switching means incorporating means selectively to interpose at least one of said special character relays in said circuit upon the establishment of a predetermined character by said tape reader, a plurality of interconnected system control relays and control switches arranged in conjunction with said local connections and intercoupled with said special character and special function control relays, said group of cascade connected relays and said tape advancing means to limit operation of said system to one operating cycle for each manipulation of one of said control switches for selectively inserting and deleting special character and special function signals at said output connection.

2. In a printing telegraph system arranged for producing outgoing signals in a desired operational code in response to signals established in a given operational code of the type having a tape reader incorporating tape advancing means, a transmitting distributor having output connections coupled to said tape reader for transmitting signal elements established therein and local connections for generating at least two sequential pulses for actuating said system, and a lock magnet having an armature arranged to lock said tape reader when the magnet is energized, circuit connections interposed in said system for single cycle operation of said system comprising, a first relay having two actuating windings and a contact structure comprising transfer and two pairs of make contacts, a second relay having two actuating coils and a contact structure comprising two pairs of make contacts and two pairs of break contacts, a multi-position switch having one switch section with contacts arranged to close in one position of the switch and a transfer switch section comprising a back contact closed on an arm in said one position and a front contact arranged to close on said arm in another position of said switch, a circuit from said lock magnet through said one switch section and one set of make contacts on said first relay to energize said lock magnet and lock said tape reader in spacing condition when said switch is in said one position, one set of break contacts of said second relay being connected in parallel with said one set of make contacts of said first relay, a circuit from said connections generating the first of said pulses to the arm of said transfer contacts of said first relay, the back contact of said transfer contacts to one set of make contacts of said second relay to one of the actuating coils of the latter relay for activating the same in one sense, a circuit from said connections generating a second of said pulses to the arm of said transfer switch section and the back contact thereof to the other set of break contacts on said second relay and to one of the actuating windings of said first relay to actuate the same in one sense, a circuit from the front contact of said transfer switch section to the other make contacts of said first relay to the other actuating winding of that relay to actuate the same in the opposite sense, and a circuit from the front contact of the transfer contacts of said first relay through the other make contacts of said second relay to the other of the actuating coils of that relay to actuate the same in the opposite sense, whereby said system is made to operate for one complete cycle for each manipulation of said multi-position switch.

3. In a telegraph printing system utilizing fixed unit signal code and having a tape reader, a transmitting distributor, a signal element storage relay for each unit of said code having contacts connected to said tape reader to establish a potential on an element of said transmitting distributor when actuated in accordance with the signal characters sensed by said tape reader to be transmitted by said transmitting distributor, means to register the count of the signal characters transmitted, switching means responsive to a prearranged character as sensed in said tape reader, means operated by said registering and said switching means to interrupt the transmission of said signal characters after the registration of a predetermined number of said signal characters and sensing of said prearranged character, means operated by said interrupting means to energize said signal element storage relays during said interruption in accordance with function performing characters not appearing in said signal characters whereby said distributor transmits said function performing characters during said interruption, and means operated by said interrupting means to reestablish the transmission of said signal characters after the transmission of said function performing characters, and means operated by said registering means to interrupt the transmission of said signal characters without the occurrence of said prearranged character and to insert a predetermined character and said function performing signals upon the transmission of a second greater predetermined number of signal characters.

4. In a telegraph printing system utilizing a fixed unit signal code and having a tape reader, a transmitting distributor, a signal element storage relay for each unit of said code having contacts connected to said tape reader to establish a potential on an element of said transmitting distributor when actuated in accordance with the signal characters sensed by said tape reader to be transmitted by said transmitting distributor, means to register the count of the signal characters transmitted, switching means responsive to the occurrence of a group interval in said signal characters as sensed in said tape reader, means operated under the joint control of said registering means and said switching means to interrupt the transmission of said signal characters upon the occurrence of a group interval after the registration of a predetermined number of said signal characters, means operated by said interrupting means to energize said signal element storage relays during said interruption in accordance with function performing characters not appearing in said signal characters whereby said distributor transmits said function performing characters during said interruption, and means operated by said interrupting means to reestablish the transmission of said signal characters after the transmission of said function performing characters, and means operated by said registering means upon a second predetermined number of signal characters after said first predetermined number without the occurrence of said group interval to interrupt the transmission of said signal characters and to insert said function performing signals including a predetermined character indicative of said lack of said group interval where said group interval does not occur immediately following.

5. In a printing telegraph system arranged for producing outgoing signals in a desired operational code in response to signals established in a given operational code of the type having a tape reader incorporating tape advancing means, a transmitting distributor having output connections coupled to said tape reader for transmitting signal elements established therein and local connections for generating at least two sequential pulses for actuating said system, and a lock magnet having an armature arranged to lock said tape reader when the magnet is energized, circuit connections interposed in said system for single cycle control of said system comprising, a first relay having operate and release windings and a contact structure comprising transfer and two pairs of make contacts, a second relay having operate and release coils and a contact structure comprising two pairs of make contacts and two pairs of break contacts, a multi-position switch having one switch section with contacts arranged to close in one position of the switch and a transfer switch section comprising a back contact closed on an arm in said one position and a front contact arranged to close on said arm in another position of said switch, a circuit from said lock magnet through said one section of said switch and one set of make contacts on said first relay to energize said lock magnet and lock said tape reader in spacing condition when said switch is in said one position, one set of break contacts of said second relay being connected in parallel with said one set of make contacts of said first relay, a circuit from said connections generating the first of said pulses to the arm of said transfer contacts of said first relay, the back contact of said transfer contacts to one set of make contacts of said second relay to the release coil of the latter relay for activating the same, a circuit from said connections generating a second of said pulses to the arm of said transfer switch section and the back contact thereof to the other set of break contacts on said second relay and to the operate winding of said first relay, a circuit from the front contact of said transfer switch section to the other make contacts of said first relay to the release winding of that relay, and a circuit from the front contact of the transfer contacts of said first relay through the other make contacts of said second relay to the operate coil of that relay, whereby said tape reader is advanced one character for each manipulation of said multi-position switch.

6. In a printing telegraph system arranged for producing outgoing signals in a desired operational code in response to signals established in a given operational code of the type having a tape reader, a transmitting distributor having output connections coupled to said tape reader for transmitting signal elements established therein and local connections for generating at least three sequentially occurring pulses for actuating elements of said system in proper time phase, and at least one function signal insertion relay having a contact structure arranged to establish potentials corresponding to signal elements of predetermined functions on said transmitting distributor, circuit connections interposed in said system for single insertion control of said predetermined character comprising, a step relay having operate and release windings and a contact structure comprising at least transfer, break and make contacts, a lock relay having operate and release coils and a contact structure comprising at least two pairs of make contacts and one pair of break contacts, a multiposition switch having a transfer switch section comprising a back contact closed on an arm in one position of the switch and a front contact arranged to close on said arm in another position of said switch and another switch section with contacts arranged to close in said other position of the switch, a circuit from said contacts of said other switch section, the break contacts on said step relay one set of make contacts of said lock relay, to the local connections for generating the third of said pulses to apply the same to said function insertion relay when said switch is in said one position, a circuit from said local connections generating the first of said pulses to the arm of said transfer contacts of said step relay, the back contact of said transfer contacts to the other set of make contacts of said lock relay to the release coil of the latter relay for activating the same, a circuit from said local connections forming the second of said pulses to the arm of said transfer switch section, the back contact thereof to the break contacts on said lock relay and to the operate winding of said step relay, a circuit from the front contact of said transfer switch section to the make contacts of said step relay to the release winding of that relay, and a circuit from the front contact of the transfer contacts of said step relay to the operate coil of said lock relay, whereby said function insertion relay is actuated once for each manipulation of said multi-position switch.

7. In a printing telegraph system arranged for producing outgoing signals in a desired operational code in response to signals established in a given operational code of the type having a tape reader, a relay inspection circuit having the input thereof coupled to said tape reader and a plurality of outputs, a bank of signal element storage relays coupled to one of said outputs to establish code signal elements therein, corresponding to the signal elements established by said tape reader, a transmitting distributor having output connections coupled to said relay storage bank for transmitting signal elements established therein and local connections generating operate, step and count pulses to elements of said system for actuating said system in proper time phase, a ground interval control relay having one actuating winding coupled to an output of said inspection circuit individually responsive to a predetermined character as expressed in said given code and another winding, said relay having a contact structure at least comprising break contacts and transfer contacts including an arm, front and back contacts, a group interval function control relay having one actuating coil coupled to the proper function signal insertion relay to insert signal elements expressing the function under consideration in said desired code on said transmitting distributor and another actuating coil, said function control relay having a contact structure comprising at least break contacts and transfer contacts, another special insertion control relay having make contacts and two actuating windings, a group of cascade connected relays having contact structures coupled to said storage relays and actuating windings coupled to said function insertion control relays to insert characters in said desired code in said relay storage bank to produce special function signals at said output connection, a count registering device having a count coil connected to said local connections for generating count pulses and a reset coil, said device having a contact structure including a common contact arm, a first contact arranged to close on said arm at a first predetermined count and a second contact arranged to close on said arm at a predetermined second greater count, a circuit from said local connections for generating operate pulses to the arm of said transfer section of said group interval function control relay and from the back contacts thereof to the input of said group of cascade relays, another circuit from the front contacts of said transfer section of said end-of-line function relay to said one winding of said word space relay, a circuit through the break contacts of said group interval function relay to the reset coil of said count registering device to energize the same for resetting, a further circuit from said local connections for generating step pulses through the break contacts on said group interval control relay to said first contact of said count registering device, a connection from said second contact of said count registering device to said connection for generating step pulses, a connection from said common control arm to the arm of said transfer section of said group interval control relay and the back contacts of said group terval function control relay for actuating the same, another connection from the front contact of said transfer section to the release winding of said special insertion control relay, and a further connection from said one actuating winding of said special control relay to the final relay of said cascade group to reset said special insertion control relay in the operated condition upon transmission of said characters to said output connection, whereby the special function character signals are applied to said output connection upon the occurrence of said predetermined character after said first predetermined count and a special character and said special function character signals are applied to said output connection upon the non-occurrence of said group interval character before said second predetermined count and immediately following thereafter.

8. In a printing telegraph system arranged for producing outgoing signals in a desired operational code in response to signals established in a given operational code of the type having a tape reader, a relay inspection circuit having the input thereof coupled to said tape reader and a plurality of outputs, a bank of signal element storage relays coupled to one of said outputs to establish code signal elements therein, corresponding to the signal elements established by said tape reader, a transmitting distributor having output connections coupled to said relay storage bank for transmitting signal elements established therein and local connections generating operate, step and count pulses to elements of said system for actuating said system in proper time phase, a word space control relay having a release winding coupled to an output of said inspection circuit individually responsive to a predetermined word space character as expressed in said given code and an operate winding, said relay having a contact structure at least comprising break contacts and transfer contacts including an arm, front and back contacts, and end-of-line function control relay having an operate coil coupled to the proper function relay to insert signal elements expressing the function under consideration in said desired code on said transmitting distributor and a release coil, said function control relay having a contact structure comprising at least break contacts and transfer contacts, a hyphen insertion control relay having make contacts and operate and release winding, a group of cascade connected relays having contact structures coupled to said storage relays and operate windings coupled to said function insertion control relays to insert characters in said desired code in said relay storage bank to produce special function signals at said output connection, a count registering device having a count coil connected to said local connections for generating count pulses and a reset coil, said device having a contact structure including a common contact arm, a first contact arranged to close on said arm at a first predetermined count and a second contact arranged to close on said arm at a predetermined second greater count, a circuit from said local connections for generating operate pulses to the arm of said transfer section of said end-of-line function control relay and from the back contacts thereof to the input of said group of cascade relays, another circuit from the front contacts of said transfer section of said end-of-line function relay to the operate winding of said word space relay, a circuit through the break contacts of said end-of-line function relay to the reset coil of said count registering device to energize the same for resetting, a further circuit from said local connections for generating step pulses through the break contacts on said word space control relay to said first contact of said count registering device, a connection from said second contact of said count registering device to said connection for generating step pulses, a connection from said common control arm to the arm of said transfer section of said word space control relay and the back contacts of said end-of-line function control relay for actuating the same, another connection from the front contact of said transfer section to the release winding of said hyphen insertion control relay, and a further connection from the operating winding of said hyphen control relay to the final relay of said cascaded group to reset said hyphen insertion control relay in the operated condition upon transmission of said characters to said output connection, whereby the special function character signals are applied to said output connection upon the occurrence of word space after said first predetermined count and a hyphen and said special function character signals are applied to said output connection upon the non-occurrence of word space before said second predetermined count and immediately following thereafter.

9. In a telegraph system arranged for producing outgoing signals in a desired code in response to signals established in a tape reader incorporating tape advancing means, a transmitting distributor having output connections coupled to said tape reader for transmitting signal elements established therein and local connections for generating at least two sequential pulses for actuating said system, and a lock magnet having an armature arranged to lock said tape reader when the magnet is energized, circuit connections interposed in said system to permit only a single cycle of operation of said system comprising, a first relay having an actuating winding and a contact structure comprising transfer and two pairs of make contacts, a second relay having an actuating coil and a contact structure comprising two pairs of make contacts and two pairs of break contacts, a multi-position switch having one switch section with contacts arranged to close in one position of the switch and a transfer switch section comprising a back contact closed on an arm in said one position and a front contact arranged to close on said arm in another position of said switch, a circuit from said lock magnet through said one switch section and one set of make contacts on said first relay to energize said lock magnet and lock said tape reader in spacing condition when said switch is in said one position, one set of break contacts of said second relay being connected in parallel with said one set of make contacts of said first relay, a circuit from said connections generating the first of said pulses to the arm of said transfer contacts of said first relay, the back contact of said transfer contacts to one set of make contacts of said second relay to the actuating coil of the latter relay for activating the same in one sense, a circuit from said connections generating a second of said pulses to the arm of said transfer switch section and the back contact thereof to the other set of break contacts on said second relay and to the actuating winding of said first relay to actuate the same in one sense, a circuit from the front contact of said transfer switch section to the other make contacts of said first relay to the actuating winding of that relay to actuate the same in the opposite sense, and a circuit from the front contact of the transfer contacts of said first relay through the other make contacts of said second relay to the actuating coil of that relay to actuate the same in the opposite sense, whereby said system is made to operate for one complete cycle only for each manipulation of said multi-position switch.

10. In a printing telegraph system arranged for producing outgoing signals in a desired code in response to signals established in a tape reader, a transmitting distributor having output connections coupled to said tape reader for transmitting signal elements established therein and local connections for generating at least three sequentially occurring pulses for actuating elements of said system in proper time phase, and at least one function signal insertion relay having a contact structure arranged to establish potentials corresponding to signal elements of predetermined functions on said transmitting distributor, circuit connections interposed in said system for single insertion control of said predetermined character comprising, a step relay having an actuating winding and a contact structure comprising at least transfer, break and make contacts, a lock relay having an actuating coil and a contact structure comprising at least two pairs of make contacts and one pair of break contacts, a multi-position switch having a transfer switch section comprising a back contact closed on an arm in one position of the switch and a front contact arranged to close on said arm in another position of said switch and another switch section with contacts arranged to close in said other position of the switch, a circuit from said contacts of said other switch section, the break contacts on said step relay, one set of make contacts of said lock relay to the local connections for generating the third of said pulses to apply the same to said function insertion relay when said switch is in said one position, a circuit from said local connections generating the first of said pulses to the arm of said transfer contacts of said step relay, the back contact of said transfer contacts to the other set of make contacts of said lock relay to the actuating coil of the latter relay for activating the same, a circuit from said local connections forming the second of said pulses to the arm of said transfer switch section, the back contact thereof to the break contacts on said lock relay and to the actuating winding of said step relay, a circuit from the front contact of said transfer switch section to the make contacts of said step relay to the actuating winding of that relay, and a circuit from the front contact of the transfer contacts of said step relay to the actuating coil of said lock relay, whereby said function insertion relay is actuated but once for each manipulation of said multi-position switch.

JAMES CURTIS PHELPS.
DOMINICK MANDATO, Jr.
ANTONIA R. SPENCER.
*Administratrix of the Estate of James Albert Spencer, deceased.*

References Cited in the file of this patent
UNITED STATES PATENTS

| Number | Name | Date |
|---|---|---|
| 2,458,144 | Bush | Jan. 4, 1949 |
| 2,549,796 | Frost | Apr. 24, 1951 |